(12) United States Patent
Azuma

(10) Patent No.: US 11,267,174 B2
(45) Date of Patent: Mar. 8, 2022

(54) INSERT-MOLDED CONTAINER MANUFACTURING METHOD

(71) Applicant: YOSHINO KOGYOSHO CO., LTD., Tokyo (JP)

(72) Inventor: Kazumi Azuma, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 58 days.

(21) Appl. No.: 16/631,371

(22) PCT Filed: Jul. 2, 2018

(86) PCT No.: PCT/JP2018/025093
§ 371 (c)(1),
(2) Date: Jan. 15, 2020

(87) PCT Pub. No.: WO2019/026509
PCT Pub. Date: Feb. 7, 2019

(65) Prior Publication Data
US 2020/0215732 A1    Jul. 9, 2020

(30) Foreign Application Priority Data
Jul. 31, 2017   (JP) .............................. JP2017-148409

(51) Int. Cl.
*B29C 45/16*    (2006.01)
*B29C 45/14*    (2006.01)
(Continued)

(52) U.S. Cl.
CPC .... *B29C 45/1671* (2013.01); *B29C 45/14467* (2013.01); *B29C 45/14811* (2013.01); *B29L 2009/003* (2013.01); *B29L 2031/712* (2013.01)

(58) Field of Classification Search
None
See application file for complete search history.

(56) References Cited

U.S. PATENT DOCUMENTS

2011/0254413 A1* 10/2011 Tsai .................. B29C 45/14836
312/223.1
2016/0318221 A1* 11/2016 Ito ..................... B29C 45/14827

FOREIGN PATENT DOCUMENTS

CN    102218797 A    10/2011
JP    H09-131753 A    5/1997
(Continued)

OTHER PUBLICATIONS

Mar. 31, 2021 Extended European Search Report issued in European Patent Application No. 18842015.2.
(Continued)

*Primary Examiner* — Edmund H Lee
(74) *Attorney, Agent, or Firm* — Oliff PLC

(57) ABSTRACT

An insert-molded container in which a secondary container made of transparent synthetic resin is integrally provided to the outside of a primary container, the secondary container includes a gate mark, and a vapor-deposited layer is provided on the outer surface of the primary container in a peripheral area of the gate mark is manufactured by a manufacturing method of insert-molded container. The method includes: a cover attaching step of attaching a cover member made of transparent synthetic resin to the outer surface of a part of the primary container where a vapor-deposited layer is provided; a placing step of placing the primary container in a mold with the cover member facing a gate; and an insert molding step of injecting a transparent synthetic resin material from the gate.

8 Claims, 6 Drawing Sheets

(51) Int. Cl.
   *B29L 9/00*        (2006.01)
   *B29L 31/00*       (2006.01)

(56)            References Cited

FOREIGN PATENT DOCUMENTS

| JP | 2007-216979 A  | 8/2007  |
|----|----------------|---------|
| JP | 2012-012072 A  | 1/2012  |
| JP | 2012-116521 A  | 6/2012  |
| JP | 2016-068557 A  | 5/2016  |
| JP | 2016-215649 A  | 12/2016 |
| WO | 2009/048139 A1 | 4/2009  |

OTHER PUBLICATIONS

Apr. 14, 2021 Office Action issued in Chinese Patent Application No. 201880046543.3.
Feb. 4, 2020 International Preliminary Report on Patentability issued in International Patent Application No. PCT/JP2018/025093.
Feb. 2, 2021 Office Action issued in Japanese Patent Application No. 2017-148409.
Aug. 21, 2018 International Search Report issued in International Patent Application No. PCT/JP2018/025093.
Oct. 8, 2021 Office Action Issued in Chinese Patent Application No. 201880046543.3.

* cited by examiner

INSERT-MOLDED CONTAINER MANUFACTURING METHOD

TECHNICAL FIELD

The present disclosure relates to an insert-molded container and a manufacturing method thereof, the insert-molded container having a double-wall structure in which a secondary container that is made of transparent synthetic resin and covers the outer surface of a primary container is integrally provided on the outside of the primary container.

BACKGROUND

An insert-molded container having a double-wall structure in which a secondary container that is made of transparent synthetic resin and covers the outer surface of a primary container is integrally provided on the outside of the primary container has been known. Since such an insert-molded container having a double-wall structure can exert an excellent optical decorating function, it is used for an application that requires product differentiation with upscale-looking packaging, such as a container containing cosmetics, for example.

The above described insert-molded container is formed into a double-wall structure by using an insert molding technique in which a transparent synthetic resin material is injected from a gate of a mold into the mold in a state where the primary container is placed in the mold as an insert material (see, for example, Patent Literature 1 (PTL 1)).

CITATION LIST

Patent Literature

PTL 1: JP2012012072 (A)

SUMMARY

Technical Problem

In the above described existing insert-molded container, a glossy vapor-deposited layer such as an aluminum vapor-deposited layer is provided on the outer surface of the primary container. Thus transparency is added to a gloss of the vapor-deposited layer, and more upscale-looking and highly aesthetic container can be provided.

However, when insert molding is performed by using, as an insert material, a primary container provided with a vapor-deposited layer, an outer surface in a peripheral area of a gate of the primary container is melted by heat and pressure of a melted synthetic resin material injected from the gate into a mold and flows with the vapor-deposited layer in the direction away from the gate. As a result, the vapor-deposited layer is peeled off in the peripheral area of the gate of the primary container, and aesthetics is impaired.

The disclosed invention is provided to solve the above described problem and to prevent a vapor-deposited layer of a primary container from being peeled off and to provide a more aesthetic insert-molded container.

Solution to Problem

A disclosed insert-molded container manufacturing method is a manufacturing method of an insert-molded container having a double-wall structure in which a secondary container that is made of transparent synthetic resin and covers the outer surface of a primary container is integrally provided to the outside of the primary container. The method includes: a cover attaching step of attaching a cover member to an outer surface of a part provided with a vapor-deposited layer of the primary container provided with the vapor-deposited layer on an outer surface, the cover member covering a part of the vapor-deposited layer and made of transparent synthetic resin; a placing step of placing the primary container in a mold with the cover member facing a gate; and an insert molding step of integrally forming the secondary container on the outside of the primary container by injecting a transparent synthetic resin material from the gate into the mold.

In the disclosed insert-molded container manufacturing method configured in the above described manner, it is preferable that the primary container includes a side wall and a bottom wall, the vapor-deposited layer is provided on the entire outer surface of the bottom wall, and in the cover attaching step, the cover member is attached to the central part of the bottom wall.

In the disclosed insert-molded container manufacturing method configured in the above described manner, it is preferable that the cover member is formed of a synthetic resin material which is the same as that forms the secondary container.

In the disclosed insert-molded container manufacturing method configured in the above described manner, it is preferable that the primary container is provided with the vapor-deposited layer on the entire outer surface.

In the disclosed insert-molded container manufacturing method configured in the above described manner, it is preferable that the secondary container is formed of a polyester-based synthetic resin material.

In the disclosed insert-molded container manufacturing method configured in the above described manner, it is preferable that the vapor-deposited layer is an aluminum vapor-deposited layer.

In the disclosed insert-molded container manufacturing method configured in the above described manner, it is preferable that the primary container is formed of a synthetic resin material having a melting point higher than that of a synthetic resin material forming the secondary container.

In the disclosed insert-molded container manufacturing method configured in the above described manner, it is preferable that the primary container is an injection molding product.

A disclosed insert-molded container is an insert-molded container having a double-wall structure in which a secondary container that covers the outer surface of a primary container and is made of transparent synthetic resin is integrally provided to the outside of the primary container. The container is characterized in that the secondary container has a gate mark, and a vapor-deposited layer is provided on the outer surface of the primary container in a peripheral area of the gate mark.

In the disclosed insert-molded container configured in the above described manner, it is preferable that the primary container includes a side wall and a bottom wall, the gate mark faces a central part of the bottom wall, and the vapor-deposited layer is provided on the entire outer surface of the bottom wall.

In the disclosed insert-molded container configured in the above described manner, it is preferable that the vapor-deposited layer is provided on the entire outer surface of the primary container.

In the disclosed insert-molded container configured in the above described manner, it is preferable that the secondary container is formed of a polyester-based synthetic resin material.

In the disclosed insert-molded container configured in the above described manner, it is preferable that the vapor-deposited layer is an aluminum vapor-deposited layer.

In the disclosed insert-molded container configured in the above described manner, it is preferable that the primary container is formed of a synthetic resin material having a melting point higher than that of a synthetic resin material forming the secondary container.

In the disclosed insert-molded container configured in the above described manner, it is preferable that the primary container is an injection molding product.

Advantageous Effect

According to the present disclosure, a vapor-deposited layer on a primary container is prevented from being peeled off and an insert-molded container with better aesthetics can be provided.

DETAILED DESCRIPTION

The present disclosure will be illustrated in more detail below with reference to the drawings.

Figure 1:
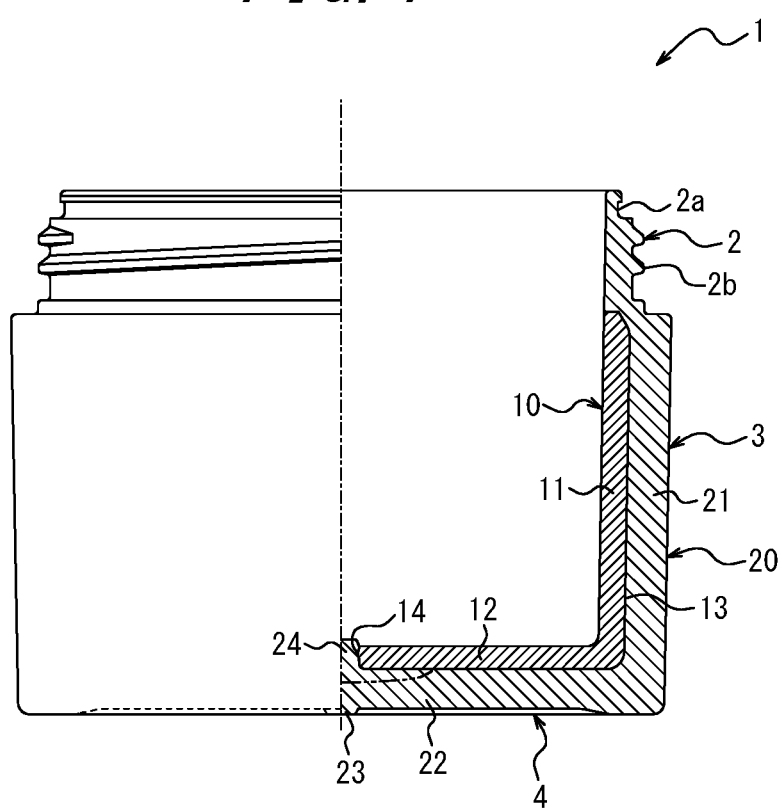
FIG. 1 is a half cross-sectional view of an insert-molded container according to an embodiment of the present disclosure.

An insert-molded container 1 according to an embodiment of the present disclosure illustrated in FIG. 1 is an insert molding having a double-wall structure in which a secondary container 20 that covers an outer surface of a primary container 10 and is made of transparent synthetic resin is integrally provided to the outside of the primary container 10. The insert-molded container 1 includes a cylindrical mouth 2, a cylindrical body 3 being continuous to the mouth 2 and a circular bottom portion 4 that closes the lower end of the body 3, and has a jar shape as a whole.

Figure 2:
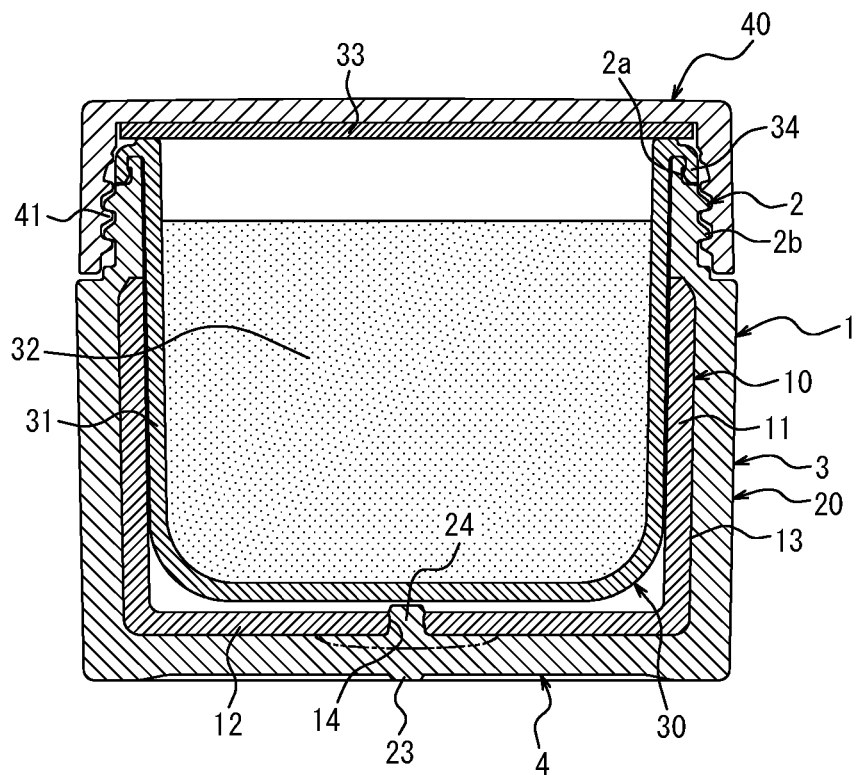
FIG. 2 is a cross-sectional view of a cosmetics container using the insert-molded container illustrated in FIG. 1.

The insert-molded container 1 can be used as a cosmetics container that contains cosmetics as contents. FIG. 2 illustrates a case where the insert-molded container 1 is formed as a refill type (replacing type) cosmetics container in which a refill container 30 filled with cosmetics is placed and the mouth 2 is blocked by a cap 40.

The refill container 30 has a sealed structure in which cosmetics 32 is filled inside a bottomed cylindrical refill container main body 31 having a shape corresponding to an inner surface of the insert-molded container 1 and a sheet-like blocking body 33 is fixed to an opening of the refill container 30 by means of adhesive and the like to seal the opening. The refill container main body 31 may be formed of a polypropylene resin, for example. The outer periphery of the upper end of the refill container main body 31 is provided with a claw locking portion 34, which is in undercut engagement with a groove 2a provided in the outer periphery of the upper end of the mouth 2. In this manner the refill container 30 is held by the insert-molded container 1 in an attachable/detachable manner.

The cap 40 is formed from polypropylene resin into a topped cylindrical shape having an outer diameter corresponding to that of the refill container main body 31. A female thread 41 provided to the inner peripheral surface thereof is screw connected to a male thread 2b provided on an outer peripheral surface of the mouth 2. In this manner the cap 40 is attachable to and detachable from the insert-molded container 1.

Cosmetics 32 can be taken out of the refill container main body 31 and used by removing the cap 40 from the insert-molded container 1 and peeling off the blocking body 33 to open the refill container main body 31. After use, the refill container main body 31 can be closed for storing the cosmetics by attaching the cap 40 to the insert-molded container 1. When the cosmetics 32 are all removed and the refill container main body 31 gets empty, the empty refill container main body 31 is removed from the insert-molded container 1 and a new refill container 30 is placed in the insert-molded container 1. In this manner the insert-molded container 1 can be reused.

It is to be noted that the contents may be directly contained in the insert-molded container 1 without using the refill container 30.

As illustrated in FIG. 1, the primary container 10 is formed into a bottomed cylindrical shape including a cylindrical side wall 11 and a bottom wall 12 that closes the lower end of the side wall 11. The side wall 11 forms the inner peripheral side of the body 3 of the insert-molded container 1 and the bottom wall 12 forms the upper surface side of the bottom 4 of the insert-molded container 1.

In this embodiment, the primary container 10 is a polycarbonate injection molding product formed by injecting polycarbonate (PC).

It is to be noted that the primary container 10 may be made not only of polycarbonate but also of other synthetic resin materials or other materials such as glass and metal. When the primary container 10 is made of synthetic resin material, the primary container 10 may be formed not only by injection molding of the synthetic resin material but also by blow molding thereof.

The entire outer surface of the primary container 10 is provided with the vapor-deposited layer 13. That is, the vapor-deposited layer 13 is provided on the entire outer surface of the side wall 11 facing outward and the entire outer surface of the bottom wall 12 facing outward, and thus all over the outer surface of the primary container 10 is covered by the vapor-deposited layer 13. It is to be noted that the vapor-deposited layer 13 is not provided on the inner side surface of the primary container 10, and the polycarbonate is exposed.

In this embodiment, the vapor-deposited layer 13 provided on the outer surface of the primary container 10 is an aluminum vapor-deposited layer. Since the vapor-deposited layer 13, which is an aluminum vapor-deposited layer, is provided, the entire outer surface of the primary container 10 is decorated like a glossy mirror.

The secondary container 20 is formed into a bottomed circular shape including the cylindrical side wall 21 and the bottom wall 22 that closes the lower end of the side wall 21. The side wall 21 forms the outer peripheral side of the body 3 of the insert-molded container 1, and the bottom wall 22 forms the lower surface side of the bottom 4 of the insert-molded container 1.

The secondary container 20 is made of transparent synthetic resin and is formed by injecting a polyester-based synthetic resin material to the outside of the primary container 10 in the insert molding in which the primary container 10 is used as an insert material. In this embodiment, the synthetic resin material forming the secondary container 20 is PCTA resin, which is a kind of saturated polyester resin. In this context, the secondary container 20 may be transparent to such an extent that the vapor-deposited layer 13 on the outer surface of the primary container 10 can be visually confirmed through the secondary container 20, and it may be translucent, for example.

It is preferable that the synthetic resin material forming the secondary container 20 has a melting point lower than that forming the primary container 10, which prevents, during insert molding, the primary container 10 placed as an insert material in the mold from being melted by heat of the synthetic resin material which is melted and injected into the mold to form the secondary container 20.

The bottom wall 22 of the secondary container 20 includes, at the central part (center position) thereof, a substantially columnar shaped gate mark 23 protruding from the bottom surface of the bottom wall 22. The gate mark 23 is generated when a synthetic resin material in a gate remains in a portion of the secondary container 20 corresponding to the gate of the mold, when the secondary container 20 is injection molded by the injection molding in which the primary container 10 is used as an insert material. The gate mark 23 faces the central part (center position) of the bottom wall 12 of the primary container 10. That is, the peripheral area of the gate mark 23 in the bottom wall 12 of the primary container 10 is a portion where the vapor-deposited layer 13 is provided. It is to be noted that the inner side of the bottom wall 22 is slightly recessed upward relative to its outer peripheral edge, and the gate mark 23 protrudes from the bottom surface of the bottom wall 22 in the recess range.

In the above described insert molding, the mouth 2 is molded with the secondary container 20 and is integrally continuous to the upper end of the side wall 21 of the secondary container 20. Further, the central part of the bottom wall 12 of the primary container 10 is provided with a through hole 14, and a protrusion 24 protruding from the upper surface of the bottom wall 22 of the secondary container 20 is fitted into the through hole 14.

The insert-molded container 1 according to this embodiment configured in the above described manner has a double-wall structure in which the secondary container 20 that covers the outer surface of the primary container 10 and is made of transparent synthetic resin is integrally provided to the outside of the primary container 10 that has an outer surface provided with a glossy vapor-deposited layer 13. Thus, a glossy vapor-deposited layer 13 provided on the outer surface of the primary container 10 can be visually confirmed through the secondary container 20. Further, an optical decorating function of the transparent secondary container 20 adds transparency to the gloss of the vapor-deposited layer 13 provided on the outer surface of the primary container 10. Moreover, in the insert-molded container 1 according to this embodiment, the vapor-deposited layer 13 is provided on the entire outer surface of the bottom wall 12 of the primary container 10, which is a peripheral area of the gate mark 23. Therefore, in the insert-molded container 1 according to this embodiment, there is no peeling off of the vapor-deposited layer 13 in the peripheral area of the gate mark of the primary container 10, and thus the body 3 and the bottom 4 are wholly upscale-looking and highly aesthetic.

In this manner, according to the insert-molded container 1 of this embodiment, in a double-wall structure in which a secondary container 20 that covers the outer surface of the primary container 10 and is made of transparent synthetic resin is integrally provided to the outside of the primary container 10 having an outer surface provided with a glossy vapor-deposited layer 13, a vapor-deposited layer 13 is provided also to a peripheral area of the gate mark 23 of the primary container 10. In this manner, the primary container 10 has no peeling off of the vapor-deposited layer 13 in the peripheral area of the gate mark 23, and thus aesthetics of the insert-molded container 1 can be enhanced.

Further, in the insert-molded container 1 according to this embodiment, a polyester-based synthetic resin material is used as a synthetic resin material forming the secondary container 20. Thus a transparency of the secondary container 20 is increased, and as a result the aesthetics of the insert-molded container 1 can be enhanced.

Moreover, in the insert-molded container 1 according to this embodiment, the gate mark 23 is provided such that it faces the central part of the bottom wall 12 of the primary container 10, and the vapor-deposited layer 13 is provided on the entire outer surface of the bottom wall 12. Since the gate mark 23 is provided to the bottom 4 that is inconspicuous from outside, the aesthetics of the bottom 4 can also be enhanced.

Furthermore, in the insert-molded container 1 according to this embodiment, since the vapor-deposited layer 13 is provided on the entire outer surface of the primary container 10, the aesthetics of the insert-molded container 1 can be enhanced in more effective manner.

Moreover, in the insert-molded container 1 according to this embodiment, since an aluminum vapor-deposited layer is used as the vapor-deposited layer 13, the primary container 10 is glossy, and as a result the aesthetics of the insert-molded container 1 can be enhanced in more effective manner.

The insert-molded container 1 according to this embodiment configured in the above described manner can be manufactured by an insert-molded container manufacturing method according to an embodiment of the present disclosure. A procedure of manufacturing the insert-molded container 1 by the manufacturing method of the insert-molded container according to an embodiment of the present disclosure will be described below with reference to FIGS. 3 to 6.

Figure 3:
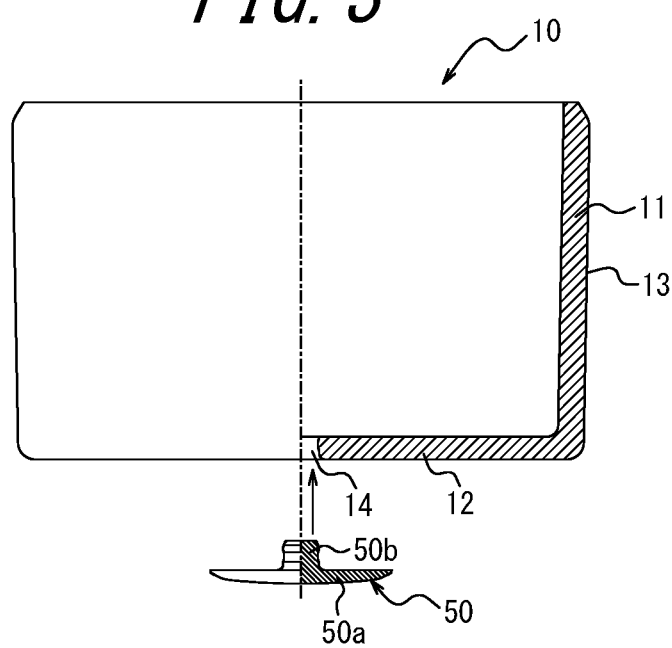
FIG. 3 is a half cross-sectional view illustrating, with a cover member, a primary container whose outer surface is provided with a vapor-deposited layer.

First, as illustrated in FIG. 3, the primary container 10 whose outer surface is provided with the vapor-deposited layer 13 and a cover member 50 are prepared.

The cover member 50 is made of synthetic resin material (PCTA resin), which is the same as the synthetic resin material that forms the secondary container 20, and is formed into a shape that includes a circular dish-shaped cover main body 50a and a columnar shaft portion 50b protruding from the center of the cover main body 50a. The diameter of the cover main body 50a is smaller than that of the bottom wall 12 of the primary container 10, and the diameter of the shaft portion 50b is slightly smaller than the inner diameter of the through hole 14 of the primary container 10.

Figure 4A:
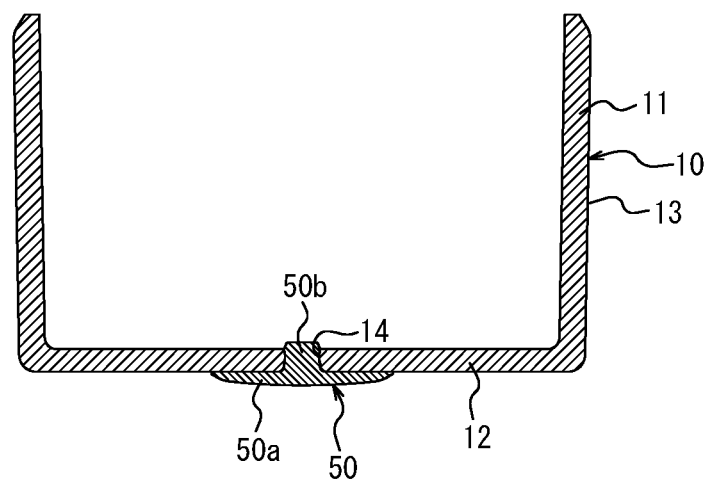
FIG. 4A is a cross-sectional view of the primary container to which a cover member is attached in a cover attaching step.
Figure 4B:
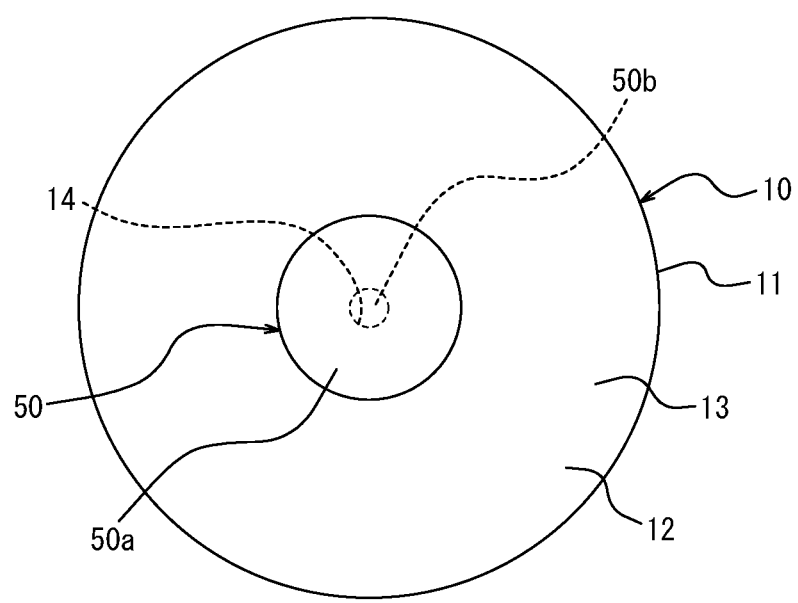
FIG. 4B is a bottom view of the primary container in FIG. 4A.

Next, as illustrated in FIG. 4A, the shaft portion 50b of the cover member 50 is inserted from outside into the through hole 14 of the primary container 10 to attach the cover member 50 to the primary container 10 (cover attaching step). When the cover member 50 is attached to the primary container 10, as illustrated in FIG. 4B, the central part of the outer surface of the bottom wall 12 of the primary container 10, that is, the central part of the vapor-deposited layer 13 provided on the bottom wall 12, is covered by the cover main body 50a. It is to be noted that, when the shaft portion 50b is inserted into the through hole 14 in a press-fitted manner, the cover member 50 is held by the bottom wall 12.

Figure 5:
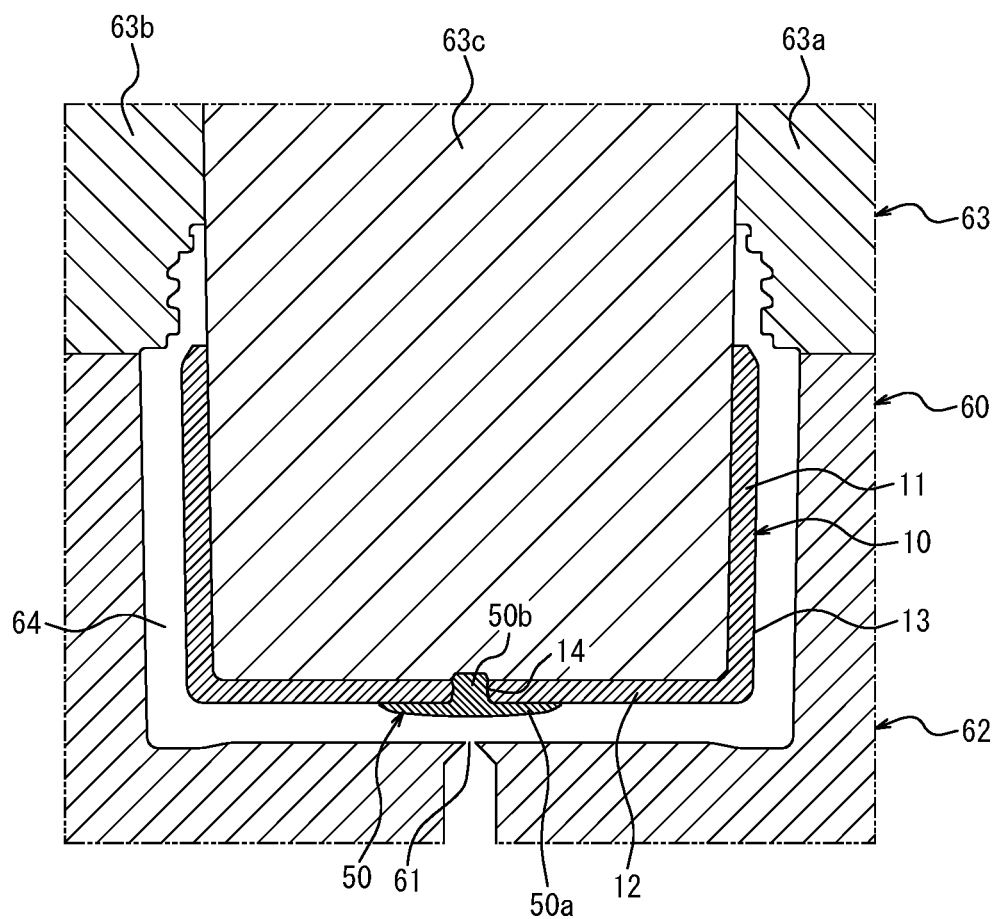
FIG. 5 is a cross-sectional view illustrating a state where the primary container to which the cover member is attached is placed in a mold in a placing step.

After the cover member 50 is attached to the primary container 10, the primary container 10 to which the cover member 50 is attached is placed, as an insert material, inside the mold 60 for insert molding, as illustrated in FIG. 5 (placing step). In a state where the primary container 10 is placed in the mold 60 and held thereby, the cover main body 50a of the cover member 50 attached to the bottom wall 12 of the primary container 10 faces a gate 61 such that the center position thereof is aligned with the axial center of the gate 61 of the mold 60.

The mold 60 includes a lower mold 62 and an upper mold 63. A part of the upper mold 63 can be split into right and left (63a and 63b), and the primary container 10 is fitted with a columnar portion 63c of the upper mold 63 provided to the axial center of the split molds 63a and 63b and is held thereby. It is to be noted that the mold 60 is not limited to the mold configured in the above described manner, and the mold 60 configured in any other manners can be used as long as the mold can perform insert molding using the primary container 10 as an insert material.

Figure 6:
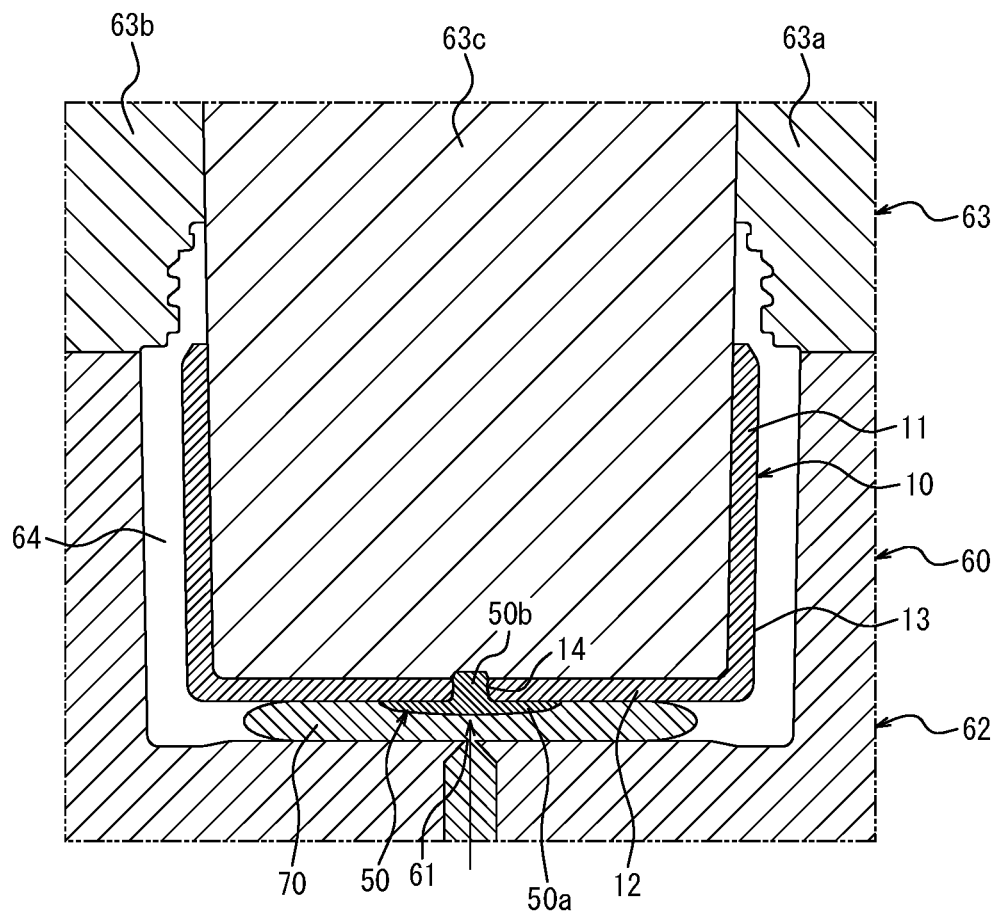
FIG. 6 is a cross-sectional view illustrating a state where a synthetic resin material is injected from a gate into the mold in an insert molding step.
Figure 7:
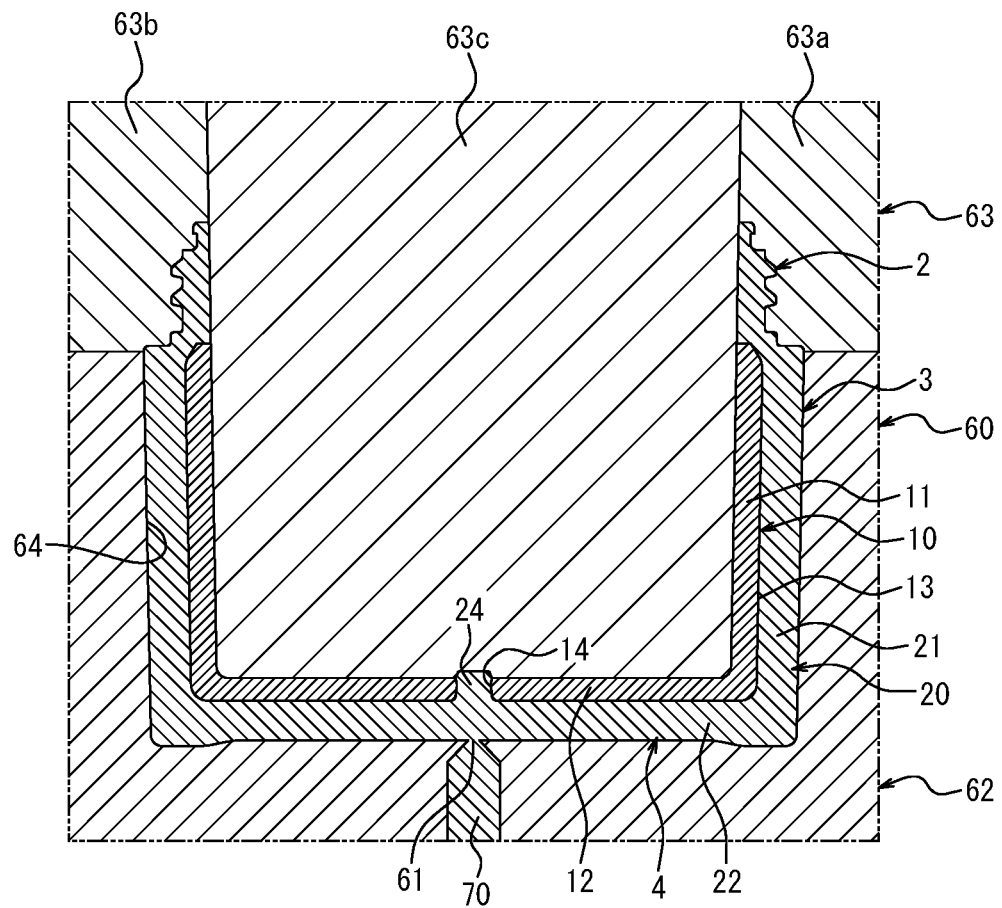
FIG. 7 is a cross-sectional view illustrating a state where the insert molding step is finished.

After the primary container 10 to which the cover member 50 is attached is placed as an insert material in the mold 60, and the mold 60 is clamped, a transparent synthetic resin material (PCTA resin) 70 that forms the secondary container 20 is injected from the gate 61 toward inside of the mold 60, that is, toward the cavity 64 formed between the outer surface of the primary container 10 and the inner surface of the mold 60, as illustrated in FIG. 6, and insert molding is performed (insert molding step). When the synthetic resin material 70 injected during the insert molding is cured inside the cavity 64, the secondary container 20 is integrally formed outside the primary container 10 as illustrated in FIG. 7.

In this context, since the cover member 50 is attached to a portion of the primary container 10 facing the gate 61, the synthetic resin material 70 injected from the gate 61 into the mold 60 during insert molding flows toward corners inside the cavity 64 after hitting against the cover main body 50a of the cover member 50, and does not hit against the vapor-deposited layer 13 directly. Therefore, the primary container 10 or the vapor-deposited layer 13 can be protected, by the cover member 50, from the heat and pressure of the melted synthetic resin material 70 that is injected from the gate 61 toward inside of the mold 60. In this manner, the insert molding is performed with the cover member 50 attached to the portion that faces the gate 61 of the primary container 10, thus the primary container 10 or the vapor-deposited layer 13 is protected from heat and pressure of the melted synthetic resin material 70. Thus, when the outer surface is melted in the peripheral area of the gate 61 of the primary container 10 and is flowed with the vapor-deposited layer 13 in the direction away from the gate 61, occurrence of a portion where the vapor-deposited layer 13 is peeled off can be prevented in the peripheral area of the gate 61 of the primary container 10.

It is to be noted that, since the cover member 50 is made of a synthetic resin material which is the same as the synthetic resin material 70 that forms the secondary container 20, it is melted by the heat and the pressure during the insert molding and is integrated with the secondary container 20, which results in high transparency of the bottom wall 22 of the secondary container 20 at the bottom 4 of the insert-molded container 1 manufactured, and the aesthetics is not lost. It is to be noted that the shaft portion 50b of the cover member 50 will be a protrusion 24 formed integrally with the secondary container 20 of the insert-molded container 1.

In this manner, according to the manufacturing method of the insert-molded container of this embodiment, the cover member 50 is attached to a portion facing the gate 61 of the primary container 10 so that the primary container 10 or the vapor-deposited layer 13 is protected by the cover member 50 in the peripheral area of the gate 61 during insert molding. In this manner, peeling off of the vapor-deposited layer 13 in the peripheral portion of the gate 61 of the primary container 10 is prevented, and a highly aesthetic insert-molded container 1 can be manufactured.

Further, in the manufacturing method of the insert-molded container according to this embodiment, the cover member 50 is attached with the gate 61 facing the central part of the bottom wall 12 of the primary container 10. Thus, peeling off of the vapor-deposited layer 13 on the bottom wall 12 can be prevented while the synthetic resin material 70 forming the secondary container 20 is filled from the gate 61 uniformly to the outside of the primary container 10 in the mold 60.

Moreover, in the manufacturing method of the insert-molded container according to this embodiment, since the cover member 50 is formed of the synthetic resin material which is the same as that forming the secondary container 20, the cover member 50 is integrated with the secondary container 20 after insert molding, and the aesthetics of the insert-molded container 1 can be further enhanced.

Furthermore, in the manufacturing method of the insert-molded container according to this embodiment, the primary container 10 is formed of the synthetic resin material having a melting point higher than that of the synthetic resin material forming the secondary container 20. Thus, the primary container 10 is prevented from being melted by the heat or the pressure of the synthetic resin material injected into the mold 60 in the insert molding step. Thus, when the outer surface is melted by the hear or the pressure of the synthetic resin material 70 in the peripheral area of the gate 61 of the primary container 10 and is flowed with the vapor-deposited layer 13 in the direction away from the gate 61, occurrence of a portion where the vapor-deposited layer 13 is peeled off in the peripheral area of the gate 61 of the primary container 10 can be prevented.

Needless to say, the present disclosure is not limited to the above described embodiment, and various changes may be made without departing the gist thereof.

For example, in the above described embodiment, the insert-molded container 1 has a jar-like outer shape, but it is not limited thereto, and the container 1 may have various shapes such as a bottle shape, for example.

Further, the insert-molded container 1 is not limited to those having a mouth 2 blocked by a cap 40, and it may be those having a mouth 2 to which a discharge tool such as a pump or a nozzle is attached.

Moreover, in the above described embodiment, PCTA resin is used as a polyester-based synthetic resin material forming the secondary container 20, but it is not limited thereto, and the other polyester-based synthetic resin materials such as PET resin and PCT resin and the like may be used. Further, the synthetic resin materials other than those based on polyester, such as SAN (styrene acrylonitrile copolymer), for example, may be used.

Moreover, in the above described embodiment, the cover member 50 is formed of the synthetic resin material which is the same as that forming the secondary container 20, but it is not limited thereto, and the cover member 50 may be formed of the other synthetic resin materials as long as it is transparent. In this case, it is preferable that the synthetic resin material may have the same or similar refractive index as that forming the secondary container 20. When the cover member 50 is formed of the synthetic resin material having a refractive index that approximates to that of the synthetic resin material forming the secondary container 20, a boundary between the secondary container 20 and the cover member 50 after the insert molding is made unclear, and the aesthetics of the insert-molded container 1 can be enhanced.

Furthermore, in the above described embodiment, the vapor-deposited layer 13 is provided on the entire outer surface of the primary container 10, but it is not limited thereto, and if the vapor-deposited layer 13 is provided onto at least a peripheral area of a portion that faces the gate 61 on the outer surface of the primary container 10, the outer surface of the primary container 10 may include a portion not provided with the vapor-deposited layer 13. Further, a printing layer indicating letters and patterns may be provided on the outside of the vapor-deposited layer 13.

Moreover, in the above described embodiment, both the primary container 10 and the secondary container 20 have a bottomed circular shape, but it is not limited thereto, and their shapes may be changed to various shapes such as a polygonal tubular shape, for example. Further, either the primary container 10 or the secondary container 20 may have a bottomed cylindrical shape and the other may have a polygonal tubular shape, thus the shapes of the containers may be different from each other.

Furthermore, in the above described embodiment, the vapor-deposited layer 13 is an aluminum vapor-deposited layer, but it is not limited thereto, and the other vapor-deposited layers may be used. However, a glossy layer is preferable.

Moreover, in the above described embodiment, the gate mark 23 is provided to the bottom wall 22 of the secondary container 20, but it is not limited thereto, and the gate mark 23 may be provided to other portions. Further, in the above described embodiment, the gate 61 is provided such that it faces the bottom wall 12 of the primary container 10 during insert molding, but it is not limited thereto, and it may be provided to face the other portions.

Furthermore, in the above described embodiment, the shaft portion 50b of the cover member 50 is configured to pass through the through hole 14 provided in the bottom wall 12 of the primary container 10, but it is not limited thereto. For example, when the insert-molded container 1 is configured to contain the contents directly therein without using the refill container 30, the shaft portion 50b of the cover member 50 may be configured not to pass through the bottom wall 12 of the primary container 10.

REFERENCE SIGNS LIST

1 insert-molded container
2 mouth
2a groove
2b male thread
3 body
4 bottom
10 primary container
11 side wall
12 bottom wall
13 vapor-deposited layer
14 through hole
20 secondary container
21 side wall
22 bottom wall
23 gate mark
24 protrusion
30 refill container
31 refill container main body
32 cosmetics
33 blocking body
34 locking portion
40 cap
41 female thread
50 cover member
50a cover main body
50b shaft portion
60 mold
61 gate
62 lower mold
63 upper mold
63a split mold
63b split mold
63c columnar portion
64 cavity
70 synthetic resin material

The invention claimed is:

1. A manufacturing method of an insert-molded container having a double-wall structure in which a secondary container that is made of transparent synthetic resin and covers an outer surface of a primary container is integrally provided to an outside of the primary container, the method comprising:

a cover attaching step of attaching a cover member to an outer surface of a part provided with a vapor-deposited layer of the primary container provided with the vapor-deposited layer on an outer surface, the cover member covering a part of the vapor-deposited layer and made of transparent synthetic resin;

a placing step of placing the primary container in a mold with the cover member facing a gate; and an insert molding step of integrally forming the secondary container to an outside of the primary container by injecting a transparent synthetic resin material from the gate into the mold, wherein:

the cover member is formed into a shape that includes a cover main body and a shaft portion protruding from a center of the cover main body, and in the cover attaching step, the shaft portion of the cover member is inserted from outside into a through hole of the primary container to attach the cover member to the primary container.

2. The manufacturing method of an insert-molded container according to claim 1, wherein, the primary container includes a side wall and a bottom wall;

the vapor-deposited layer is provided on an entire outer surface of the bottom wall; and in the cover attaching step, the cover member is attached to a central part of the bottom wall.

3. The manufacturing method of an insert-molded container according to claim 1, wherein the cover member is formed of a synthetic resin material which is the same as a synthetic resin material forming the secondary container.

4. The manufacturing method of an insert-molded container according to claim 1, wherein the primary container is provided with the vapor-deposited layer on an entire outer surface thereof.

5. The manufacturing method of an insert-molded container according to claim 1, wherein the secondary container is formed of a polyester-based synthetic resin material.

6. The manufacturing method of an insert-molded container according to claim 1, wherein the vapor-deposited layer is an aluminum vapor-deposited layer.

7. The manufacturing method of an insert-molded container according to claim 1, wherein the primary container is formed of a synthetic resin material having a melting point higher than that of a synthetic resin material forming the secondary container.

8. The manufacturing method of an insert-molded container according to claim 1, wherein the primary container is an injection molding product.

\* \* \* \* \*